(12) United States Patent
Yang et al.

(10) Patent No.: US 9,802,294 B2
(45) Date of Patent: Oct. 31, 2017

(54) PRESSURE-SENSITIVE ADHESIVE TAPE (71) Applicant: LG CHEM, LTD., Seoul (KR)

(72) Inventors: Se Woo Yang, Daejeon (KR); Suk Ky Chang, Daejeon (KR); Min Soo Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/311,662

(22) Filed: Jun. 23, 2014

(65) Prior Publication Data
US 2014/0298862 A1    Oct. 9, 2014

Related U.S. Application Data (63) Continuation of application No. PCT/KR2013/002702, filed on Apr. 1, 2013.

(30) Foreign Application Priority Data

Mar. 30, 2012  (KR) .................... 10-2012-0033168

(51) Int. Cl.
*B24D 3/00*     (2006.01)
*C09J 7/02*     (2006.01)
(Continued)

(52) U.S. Cl.
CPC .......... *B24D 3/002* (2013.01); *B24B 13/0018* (2013.01); *B24B 37/042* (2013.01); *B24B 37/20* (2013.01); *B24B 37/24* (2013.01); *C09J 7/02* (2013.01); *C09J 7/0217* (2013.01); *C09J 133/08* (2013.01); *C09J 2201/134* (2013.01);
(Continued)

(58) Field of Classification Search
CPC ...... C09J 133/08–133/10; B24D 3/002; B24B 37/24; B24B 13/0018
See application file for complete search history.

(56) References Cited

U.S. PATENT DOCUMENTS 6,362,107 B1 *  3/2002  Shiro et al. .................. 438/692
7,285,313 B2 * 10/2007  Kim et al. .................... 428/1.55
(Continued)

FOREIGN PATENT DOCUMENTS

CN       100378133 C    4/2008
CN       101638561 A    2/2010
(Continued)

OTHER PUBLICATIONS

Machine Translation of JP 2010-077301A (2010).*
Machine Translation of JP 2010-221366A (2010).*

*Primary Examiner* — Scott R Walshon
(74) *Attorney, Agent, or Firm* — Dentons US LLP (57) ABSTRACT Provided are a pressure-sensitive adhesive tape, a polishing pad, a method of manufacturing the same, a polishing device and a method of manufacturing a glass substrate. The illustrative pressure-sensitive adhesive tape may be a pressure-sensitive adhesive tape for a polishing material. The pressure-sensitive adhesive tape may be effectively fixed to a surface plate without bubbles, and have excellent resistance to water and a polishing solution and shear strength applied in a polishing process. In addition, the pressure-sensitive adhesive tape may be easily removed from a carrier or surface plate for a polishing pad without residues after polishing.

13 Claims, 1 Drawing Sheet (51) Int. Cl.
 *B24B 37/20* (2012.01)
 *B24B 13/00* (2006.01)
 *B24B 37/04* (2012.01)
 *B24B 37/24* (2012.01)
 *C09J 133/08* (2006.01)

(52) U.S. Cl.
 CPC .... *C09J 2201/606* (2013.01); *C09J 2201/622* (2013.01); *C09J 2203/318* (2013.01); *C09J 2433/00* (2013.01); *G02F 2202/28* (2013.01); *Y10T 428/2848* (2015.01)

(56) References Cited

U.S. PATENT DOCUMENTS

| | | | | |
|---|---|---|---|---|
| 7,309,737 | B2 * | 12/2007 | Kim et al. | 525/100 |
| 7,462,390 | B2 * | 12/2008 | Kim et al. | 428/355 AC |
| 7,682,692 | B2 * | 3/2010 | Amano et al. | 428/355 AC |
| 7,696,278 | B2 * | 4/2010 | Kim et al. | 524/556 |
| 7,750,075 | B2 * | 7/2010 | Kim et al. | 524/560 |
| 7,767,752 | B2 * | 8/2010 | Kim et al. | 524/560 |
| 8,318,852 | B2 * | 11/2012 | Kim et al. | 524/523 |
| 8,337,961 | B2 * | 12/2012 | Kim et al. | 428/1.1 |
| 8,664,326 | B2 * | 3/2014 | Lee et al. | 524/522 |
| 9,011,995 | B2 * | 4/2015 | Park et al. | 428/1.55 |
| 2009/0098376 | A1 | 4/2009 | Fukuoka | |
| 2009/0277561 | A1 | 11/2009 | Ellringmann et al. | |
| 2010/0129569 | A1 * | 5/2010 | Park | C08L 33/08 428/1.55 |
| 2010/0202051 | A1 | 8/2010 | Yoshimi et al. | |
| 2011/0104488 | A1 * | 5/2011 | Mussig | C09J 123/02 428/355 EN |
| 2011/0139347 | A1 * | 6/2011 | Kim et al. | 156/154 |
| 2011/0284151 | A1 * | 11/2011 | Kobayashi | C09J 7/0264 156/94 |
| 2012/0064810 | A1 * | 3/2012 | Yamamoto et al. | 451/540 |
| 2013/0236724 | A1 * | 9/2013 | Yamamoto et al. | 428/349 |

FOREIGN PATENT DOCUMENTS

| | | | |
|---|---|---|---|
| CN | 102027085 A | | 4/2011 |
| JP | 09137143 A | | 5/1997 |
| JP | 2001115106 A | | 4/2001 |
| JP | 2002047468 A | * | 2/2002 |
| JP | 2004503619 A | | 2/2004 |
| JP | 2006-265410 A | | 10/2006 |
| JP | 2007-260906 A | | 10/2007 |
| JP | 2008255253 A | | 10/2008 |
| JP | 2010-077301 A | | 4/2010 |
| JP | 2010221366 A | | 10/2010 |
| JP | 2011153169 A | | 8/2011 |
| JP | 2011-168715 A | | 9/2011 |
| KR | 10-2007-0063365 A | | 6/2007 |
| KR | 10-0840114 B1 | | 6/2008 |
| KR | 10-2009-0078614 A | | 7/2009 |
| KR | 10-2011-0049689 A | | 5/2011 |
| WO | 01/96413 A1 | | 12/2001 |
| WO | 2007/132881 A1 | | 11/2007 |

* cited by examiner

PRESSURE-SENSITIVE ADHESIVE TAPE

This application is a Continuation Bypass Application of International Application No. PCT/KR2013/002702, filed Apr. 1, 2013, and claims priority to and the benefit of Korean Application No. 10-2012-0033168, filed on Mar. 30, 2012, the disclosures of which are incorporated by reference herein in their entirety.

FIELD

The present application relates to a pressure-sensitive adhesive tape, a polishing pad, a method of manufacturing the same, a polishing device, and a method of manufacturing a glass substrate.

BACKGROUND

A polishing process may be performed on various parts in manufacture of automobiles, optical apparatuses or semiconductors. For example, a substrate for a hard disk, an optical lens or a silicon wafer may be polished.

A glass substrate, which is a part of a liquid crystal display (LCD), can be polished. When the glass substrate is used as a color filter substrate for an LCD or a substrate for a thin film transistor (TFT), it may need surface smoothness.

The glass substrate may be manufactured in two types: a fusion type and a floating type. In the floating type, the glass substrate may be manufactured by moving a horizontal roller with injecting a raw material melted in a melting furnace into it. Said glass substrate might need to be polished in a subsequent process in case of it might be wrinkled by the friction with the roller,

DETAILED DESCRIPTION

Technical Object

The present application is directed to providing a pressure-sensitive adhesive tape, a polishing pad, a method of manufacturing the same, a polishing device, and a method of manufacturing a glass substrate.

Technical Solution

In one aspect, the present application provides a pressure-sensitive adhesive tape, which includes: a base layer; a first pressure-sensitive adhesive layer formed on one surface of the base layer; and a second pressure-sensitive adhesive layer formed on the other surface of the base layer. In one embodiment, the pressure-sensitive adhesive tape may be use in for a polishing material for example, a pressure-sensitive adhesive tape for a glass polishing material. Said pressure-sensitive adhesive tape for a glass polishing material, for example, can include a first pressure-sensitive adhesive layer attached to a polishing material such as porous polyurethane, and also can have a second pressure-sensitive adhesive layer attached to a carrier or surface plate for a polishing pad.

The first pressure-sensitive adhesive layer, for example, may include a pressure-sensitive adhesive resin and a tackifier. The first pressure-sensitive adhesive layer may include a tackifier, for example, at 1 to 70, 3 to 60 or 5 to 50 parts by weight with respect to 100 parts by weight of the pressure-sensitive adhesive resin. The unit "parts by weight" used herein refers to a weight ratio between the substances in composition, unless otherwise noted. In the content range, the tackifier may provide excellent compatibility with the pressure-sensitive adhesive resin, control the first pressure-sensitive adhesive layer to have a suitable flowing property at an increased temperature, and have an excellent adhesive property, a shear resistance and a water resistance.

As the pressure-sensitive adhesive resin of the first pressure-sensitive adhesive layer, for example, an acrylic resin, a silicon resin, an epoxy resin or a rubber resin may be used, but in one embodiment, an acrylic resin may be used. As the acrylic resin, for example, a resin including a (meth)acrylic acid ester monomer may be used. The (meth)acrylic acid ester monomer may be included in the resin in a polymerized form. The sentence "a predetermined component is included in a resin or polymer in a polymerized form" used herein may indicate that the predetermined component is used as, for example, a monomer or oligomer in a polymerization process for preparing the resin or polymer, thereby forming a backbone such as a main or side chain of the resin or polymer after polymerization.

As the (meth)acrylic acid ester monomer, an alkyl (meth)acrylate may be used. For example, an alkyl group having 1 to 14 carbon atoms may be used as an alkyl (meth)acrylate in consideration of physical properties of the pressure-sensitive adhesive layer. Particularly, one or at least two of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate and tetradecyl (meth)acrylate may be used.

The acrylic resin may further include a crosslinkable monomer. The crosslinkable monomer may be included in the resin in a condition of polymerized form. The term "crosslinkable monomer" may refer to a monomer having a crosslinkable functional group and a part copolymerized with another component for forming a resin. The monomer may provide a crosslinkable functional group to the resin. As the crosslinkable functional group, a hydroxyl group, a carboxyl group, an epoxy group, an isocyanate group or a nitrogen-contained functional group such as an amino group may be used. In the field of preparing a pressure-sensitive adhesive resin, various copolymerizable monomers capable of providing the above-described crosslinkable functional groups are known, and any of these monomers may be used. The crosslinkable monomer may be, but is not limited to, a hydroxyl-group-containing monomer such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate; a carboxyl-group-containing monomer such as (meth)acrylic acid, 2-(meth)acryloyloxy acetic acid, 3-(meth)acryloyloxy propylic acid, 4-(meth)acryloyloxy butylic acid, an acrylic acid dimer, itaconic acid, maleic acid or a maleic acid anhydride; or a nitrogen-containing monomer such as (meth)acrylamide, N-vinyl pyrrolidone or N-vinyl caprolactame, which may be used alone or in combination of at least two thereof.

When the crosslinkable monomer is further included, the acrylic resin may include a (meth)acrylic acid ester monomer at 50 to 99 parts by weight and a crosslinkable monomer at 0.1 to 10 parts by weight. The monomer may form a pressure-sensitive adhesive layer having a high initial adhesive strength or excellent durability within the above weight ratio.

In addition, the acrylic resin may further include a monomer having a lipophilic property. In addition, the monomer may also be included in the resin in a polymerized form. When the monomer is included in a suitable ratio, a water resistance of a pressure-sensitive adhesive may be ensured. As a lipophilic monomer, for example, a compound represented by Formula 1 may be used.

[Formula 1]

In Formula 1, $R_1$ to $R_3$ are each independently hydrogen or an alkyl group having 1 to 4 carbon atoms, $R_4$ is an aryl group having 6 to 25 carbon atoms or —C(=O)—O—X, where X is a methyl group, a tert-butyl group, a linear or branched alkyl group having 8 to 22 carbon atoms, or a cycloalkyl group having 6 to 12 carbon atoms.

The term "aryl group" used herein may refer to, unless particularly defined otherwise, a monovalent residue derived from a compound including benzene or a structure in which at least two benzenes are connected or condensed, or a derivative thereof. That is, in the range of the aryl group, an aralkyl group or arylalkyl group, in addition to functional groups conventionally referred to as aryl groups, may also be included. The aryl group may have 6 to 25 carbon atoms, 6 to 21 carbon atoms, 6 to 18 carbon atoms or 6 to 12 carbon atoms. The aryl group may be a phenyl group, a dichlorophenyl group, a chlorophenyl group, a phenylethyl group, a phenylpropyl group, a benzyl group, a tolyl group, a xylyl group or a naphthyl group. In one embodiment, the aryl group of Formula 1 may be a phenyl group.

In one embodiment, $R_1$ and $R_2$ of Formula 1 may be hydrogen.

In addition, in Formula 1, $R_3$ is hydrogen or a methyl group.

In addition, in Formula 1, $R_4$ is an aryl group having 6 to 12 carbon atoms or —C(=O)—O—X, and X is a methyl group, a tert-butyl group or a cycloalkyl group having 6 to 12 carbon atoms.

As the compound of Formula 1, for example, methyl (meth)acrylate, tert-butyl (meth)acrylate, styrene, isostearyl (meth)acrylate, isobornyl (meth)acrylate, dicyclopentanyl (meth)acrylate or adamantyl (meth)acrylate may be used, but in one embodiment, tert-butyl acrylate, styrene, methyl methacrylate, methyl acrylate or isobornyl acrylate may be used.

The acryl resin further including a lipophilic monomer may include, for example, a (meth)acrylic acid ester monomer at 50 to 99 parts by weight and a lipophilic monomer at 10 to 50 parts by weight. In addition, the resin further including a lipophilic monomer and a crosslinkable monomer may include, for example, a (meth)acrylic acid ester monomer at 50 to 99 parts by weight, a lipophilic monomer at 10 to 50 parts by weight and a crosslinkable monomer at 0.1 to 10 parts by weight. In the above weight ratio, shear resistance, an adhesive property and water resistance of the pressure-sensitive adhesive layer may be ensured in a suitable range.

In the acrylic resin, another monomer may be further included as needed. For example, the acrylic resin may further include a monomer represented by Formula 2. For example, the monomer may be one selected to control a glass transition temperature of the resin, and provide various functionalities as needed.

[Formula 2]

In Formula 2, $R_5$ to $R_7$ are each independently hydrogen or an alkyl group, $R_8$ is a cyano group; a phenyl group unsubstituted or substituted with an alkyl group; an acetyloxy group; or —$COR_9$, where $R_9$ is an amino or glycidyloxy group unsubstituted or substituted with an alkyl group or an alkoxyalkyl group.

In the definitions of $R_5$ to $R_9$ in Formula 2, an alkyl or alkoxy group may be an alkyl or alkoxy group having 1 to 20 carbon atoms, 1 to 16 carbon atoms, 1 to 12 carbon atoms, 1 to 8 carbon atoms or 1 to 4 carbon atoms, for example, a methyl group, an ethyl group, a methoxy group, an ethoxy group, a propoxy group or a butoxy group. When the monomer of Formula 2 is further included, the monomer may be included in the resin at 20 parts by weight or less based on other monomers, but the resin may be changed according to a purpose.

As the pressure-sensitive adhesive resin included in the first pressure-sensitive adhesive layer, for example, the acrylic resin may have a weight average molecular weight (Mw) of 500,000 to 1,000,000. The term "weight average molecular weight" used herein refers to a conversion value with respect to standard polystyrene measured by gel permeation chromatography (GPC). In addition, unless particularly defined otherwise, the term "molecular weight" used herein may refer to a weight average molecular weight. When the pressure-sensitive adhesive resin has the above range of molecular weight, the first pressure-sensitive adhesive layer may ensure an excellent durability and adhesive property.

The acrylic resin may be prepared by selecting necessary monomers according to a desired composition, preparing a mixture by blending the selected monomers in a desired ratio, and applying the mixture to a polymerization method such as solution polymerization, photopolymerization, bulk polymerization, suspension polymerization or emulsion polymerization.

The first pressure-sensitive adhesive layer may include additional tackifier. As the additional tackifier, a tackifier having a glass transition temperature or softening point of 85° C., 90° C. or 100° C. or more may be used. When the said tackifier is used, the first pressure-sensitive adhesive layer may be formed as, for example, a "heat-activated pressure-sensitive adhesive." The term "heat-activated pressure-sensitive adhesive" used herein may refer to a pressure-sensitive adhesive which is adhered to an adherent due to a flowing characteristic exhibited at a certain temperature or more, exhibits high cohesive strength under an atmosphere of a decreased temperature, thereby ensuring suitable adhesive strength. The upper limit of the glass transition temperature or softening point of the tackifier may be, but is not particularly limited to, approximately 200° C. or 150° C., for example, in consideration of coatability. The tackifier may be one having the above range of a glass transition temperature or softening point without particular limitation. The tackifier may be one or a mixture of at least two known tackifiers such as a hydrocarbon resin or hydrogenated product thereof, a rosin resin or hydrogenated product thereof, a rosin ester resin or hydrogenated product thereof, a terpene resin or hydrogenated product thereof, a terpene phenol resin or hydrogenated product thereof, a polymerized rosin resin, and a polymerized rosin ester resin.

The first pressure-sensitive adhesive layer may further include a multifunctional crosslinking agent. The crosslinking agent may be used to realize a crosslinking structure in the pressure-sensitive adhesive resin, or may be reacted with the pressure-sensitive adhesive resin to realize a crosslinking structure. As the crosslinking agent, a conventional crosslinking agent reacting with a pressure-sensitive adhesive resin through an aging process and realize a crosslinking structure in the pressure-sensitive adhesive resin, for example, an isocyanate crosslinking agent, an epoxy crosslinking agent, an aziridine crosslinking agent or a metal chelate crosslinking agent, may be used. Here, as an isocyanate crosslinking agent, a multifunctional isocyanate compound such as tolylene diisocyanate, xylene diisocyanate, diphenylmethane diisocyanate, hexamethylene diisocyanate, isophorone diisocyanate, tetramethylxylene diisocyanate or naphthalene diisocyanate; or a compound prepared by reacting the multifunctional isocyanate compound with a polyol compound such as trimethylol propane may be used, as an epoxy crosslinking agent, at least one selected from the group consisting of ethyleneglycol diglycidylether, triglycidylether, trimethylolpropane triglycidylether triglycidylether, N,N,N',N'-tetraglycidyl ethylenediamine and glycerin diglycidylether may be used, as an aziridine crosslinking agent, at least one selected from the group consisting of N,N'-toluene-2,4-bis(1-aziridine carboxamide), N,N'-diphenylmethane-4,4'-bis(1-aziridine carboxamide), triethylene melamine, bisisoprothaloyl-1-(2-methylaziridine) and tri-1-aziridinyl phosphine oxide may be used, but the present application is not limited thereto. In addition, as a metal chelate crosslinking agent, a compound in which a polyvalent metal such as aluminum, iron, zinc, tin, titanium, antimony, magnesium and/or vanadium is coordinated to acetyl acetone or ethyl acetoacetate may be used.

The multifunctional crosslinking agent may be included in the first pressure-sensitive adhesive layer at 0.001 to 7 parts by weight or 0.01 to 5 parts by weight with respect to 100 parts by weight of the pressure-sensitive adhesive resin. In this range, the multifunctional crosslinking agent may maintain excellent cohesive strength or durability of the pressure-sensitive adhesive layer.

The first pressure-sensitive adhesive layer may further include at least one additive selected from the group consisting of a silane coupling agent, an epoxy resin, a curing agent, a UV stabilizer, an antioxidant, a coloring agent, a reinforcing agent, a filler, a foaming agent, a surfactant and a plasticizer as needed.

The first pressure-sensitive adhesive layer may have a gel fraction of, for example, approximately 25 to 90%, 30 to 70% or 40 to 60%.

The gel fraction of the pressure-sensitive adhesive layer may be calculated as in Equation 1.

$$\text{Gel fraction}(\%) = B/A \times 100 \quad \text{[Equation 1]}$$

In Equation 1, A is a weight of the pressure-sensitive adhesive layer, and B is a dry weight of an insoluble content obtained after the pressure-sensitive adhesive layer having the weight A is precipitated in ethyl acetate at room temperature for 48 hours.

Here, the term "room temperature" may refer to a temperature as it is with no increase or decrease in temperature, for example, 10 to 30° C., 15 to 30° C., approximately 23 or 25° C.

In addition, here, the "dry weight of the insoluble content" refers to a weight measured after ethyl acetate present in the insoluble content obtained after the pressure-sensitive adhesive layer having the weight A is precipitated in ethyl acetate is dried to be removed. Here, a dry condition for the insoluble content may be suitably selected within the range in which the ethyl acetate included therein is substantially and completely removed without particular limitation.

In the range of the gel fraction, physical properties of the first pressure-sensitive adhesive layer including a pressure-sensitive adhesive property to a polishing material may be excellently maintained.

A thickness of the first pressure-sensitive adhesive layer may be, for example, approximately 40 to 70 μm or 45 to 65 μm. The thickness may be changed according to a use for the pressure-sensitive adhesive tape.

As the base layer having a surface on which the first pressure-sensitive adhesive layer is formed, for example, a plastic base layer may be used. The base layer may have a multi-layered structure in which one or at least two plastic sheets having excellent smoothness on a main surface thereof are stacked.

As a plastic base layer, a film or sheet including a cellulose resin such as triacetyl cellulose, an ethylene-vinyl acetate copolymer, a polyolefin such as polypropylene or polyethylene, polycycloolefin, a polyester such as polyethyleneterephthalate or polybutyleneterephthalate, a polycarbonate, a polynorbornene, a polyarylate, an acrylic resin, a polyphenylene sulfide, a polystyrene, a vinylic resin, a polyamide, a polyimide or an epoxy resin may be used, but the present application is not limited thereto.

Surface treatment such as corona treatment or plasma treatment may be performed, or a primer layer may be formed on a surface of the base layer which has the pressure-sensitive adhesive layer.

A thickness of the base layer may be, for example, approximately 100 to 300 μm or 150 to 220 μm. The thickness may be changed according to a use for the pressure-sensitive adhesive tape.

A second pressure-sensitive adhesive layer is formed on the other surface of the base layer, that is, a surface of the base layer which does not have the first pressure-sensitive adhesive layer.

Figure 1:
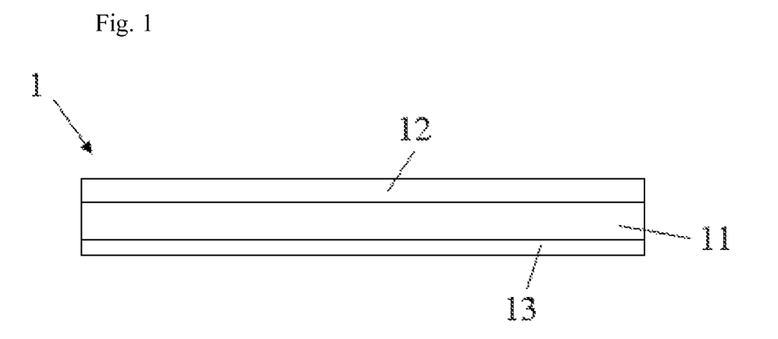
FIG. 1 is a schematic diagram of an illustrative pressure-sensitive adhesive tape.

In one embodiment, the second pressure-sensitive adhesive layer may be used to attach the pressure-sensitive adhesive tape to which the polishing material is fixed to the first pressure-sensitive adhesive layer to a carrier or surface plate for a polishing pad. FIG. 1 is a cross-sectional view schematically showing the pressure-sensitive adhesive tape 1, in which a first pressure-sensitive adhesive layer 12 is formed on one surface of a base layer 11, and a second pressure-sensitive adhesive layer 13 is formed on the other surface thereof.

The second pressure-sensitive adhesive layer may include an acid-free pressure-sensitive adhesive resin. The term "acid-free pressure-sensitive adhesive resin" used herein may refer to, for example, a pressure-sensitive adhesive resin not having a carboxyl group in an uncrosslinked state. When the acid-free pressure-sensitive adhesive resin is used, physical properties including reworkability of the pressure-sensitive adhesive tape may be excellently maintained. As the acid-free pressure-sensitive adhesive resin, an acrylic resin, a silicon resin, an epoxy resin or a rubber resin may be used, but in one embodiment, an acrylic resin may be used.

As the acid-free pressure-sensitive adhesive resin, an acid-free pressure-sensitive adhesive resin including a lipophilic monomer may be used. For example, the lipophilic monomer may be included in the pressure-sensitive adhesive resin in a polymerized state. As a lipophilic monomer, for example, the compound of Formula 1 described in the category of the pressure-sensitive adhesive resin of the first pressure-sensitive adhesive layer may be used. When the lipophilic monomer is included in the acid-free pressure-sensitive adhesive resin, an initial adhesive strength of the pressure-sensitive adhesive tape may be ensured in a suitable range, and the pressure-sensitive adhesive tape may have excellent reworkability even after a severe polishing test.

The pressure-sensitive adhesive resin may further include, for example, a (meth)acrylic acid ester monomer in a polymerized state. As the (meth)acrylic acid ester monomer, for example, a monomer, other than the compound of Formula 1, of the (meth)acrylic acid ester monomers described in the category of the pressure-sensitive adhesive resin of the first pressure-sensitive adhesive layer may be used. In this case, the acid-free pressure-sensitive adhesive resin may include a (meth)acrylic acid ester monomer at 50 to 99 parts by weight and a lipophilic monomer at 10 to 50 parts by weight. The resin may include, for example, a (meth)acrylic acid ester monomer at 50 to 99 parts by weight and a lipophilic monomer at 10 to 40 parts by weight, or a (meth)acrylic acid ester monomer at 50 to 99 parts by weight and a lipophilic monomer at 10 to 30 parts by weight. In this range, physical properties required for the second pressure-sensitive adhesive layer may be effectively ensured.

The pressure-sensitive adhesive resin may further include a crosslinkable monomer, for example, in a polymerized form. As the crosslinkable monomer, for example, a monomer not having a carboxyl group may be used as a crosslinkable functional group of the crosslinkable monomers described in the category of the pressure-sensitive adhesive resin of the first pressure-sensitive adhesive layer, but in one embodiment, a monomer having a hydroxyl group among the crosslinkable monomers described in the category of the pressure-sensitive adhesive resin of the first pressure-sensitive adhesive layer may be used.

When the crosslinkable monomer is further included, the acid-free pressure-sensitive adhesive resin may include a (meth)acrylic acid ester monomer at 50 to 99 parts by weight; a lipophilic monomer at 10 to 50 parts by weight, 10 to 40 parts by weight or 10 to 30 parts by weight; and a crosslinkable monomer at 0.1 to 10 parts by weight. In this ratio, the second pressure-sensitive adhesive layer may have suitable cohesive strength, correspond to shear strength applied in a polishing process, and ensure suitable cohesive property and repeelability by being attached to an apparatus for fixing a polishing pad.

The pressure-sensitive adhesive resin included in the second pressure-sensitive adhesive layer may have a molecular weight (Mw) of 300,000, 400,000, 500,000, 600,000, 700,000, 800,000, 1,000,000, 1,200,000 or 1,500,000 or more. When the molecular weight of the pressure-sensitive adhesive resin is controlled in the above range, the second pressure-sensitive adhesive layer may exhibit suitable resistances with respect to the cohesive strength and shear strength and suitable cohesive property and repeelability by being attached to the apparatus for fixing a polishing pad. The upper limit of the molecular weight of the acid-free pressure-sensitive adhesive resin may be, but is not particularly limited to, for example, approximately 2,000,000.

The second pressure-sensitive adhesive layer may further include a multifunctional crosslinking agent. The multifunctional crosslinking agent may be included in the pressure-sensitive adhesive layer, for example, in a state in which the pressure-sensitive adhesive resin is crosslinked. A particular example of the multifunctional crosslinking agent is already described in the category of the first pressure-sensitive adhesive layer. A weight ratio of the multifunctional crosslinking agent included in the second pressure-sensitive adhesive layer is not particularly limited, and may be, for example, 0.01 to 10 parts by weight or 0.01 to 5 parts by weight with respect to 100 parts by weight of the pressure-sensitive adhesive resin. In another embodiment, the multifunctional crosslinking agent may be included in the range in which the second pressure-sensitive adhesive layer may satisfy the following gel fraction.

The second pressure-sensitive adhesive layer may further include a plasticizer. As a plasticizer is further added, the second pressure-sensitive adhesive layer may ensure flexibility, and maintain a suitable pressure-sensitive adhesive property.

As a plasticizer, for example, a low molecular weight acrylic polymer, a fatty acid ester, for example, a phthalic acid ester such as dibutyl phthalate, dioctyl phthalate, bis(2-ethylhexyl)phthalate, didecylphthalate or diisodecyl phthalate, an adipic acid ester such as bis(2-ethylhexyl) adipate or dioctyl adipate, a sebacic acid ester such as bis(2-ethylhexyl)sebacate or dibutyl sebacate or an azelaic acid ester such as bis(2-ethylhexyl)azelate, paraffin such as chlorinated paraffin, glycol such as polypropyleneglycol, an epoxy-based polymer plasticizer such as epoxylated soybean oil, a phosphoric acid ester such as triphenyl phosphate, or a phosphorous acid ester such as triphenyl phosphite may be used.

For example, when the pressure-sensitive adhesive resin is an acrylic resin, in consideration of compatibility with the pressure-sensitive adhesive resin, a low molecular weight acrylic polymer may be used as a plasticizer. The plasticizer may be a polymer having a molecular weight of, for example, approximately 1,000 to 100,000 or 1,500 to 6,000, and a glass transition temperature of approximately 10 or 0° C. or less, or 0 to −80° C.

As an acrylic polymer capable of being used as a plasticizer, for example, a material produced by Toagosei co., Ltd. under the trade name of ARUFON UP-1000, ARUFON UP-1010, ARUFON UP-1020, ARUFON UP-1021, ARUFON UP-1110, ARUFON UH-2032, ARUFON UH-2041, ARUFON UC-3510, ARUFON UG-4000, ARUFON UG-4010 or ARUFON US-6110 may be used.

In the second pressure-sensitive adhesive layer, the plasticizer may be included at 0.5 to 30 parts by weight or 1 to 10 parts by weight with respect to 100 parts by weight of the pressure-sensitive adhesive resin. In this ratio, the flexibility and pressure-sensitive adhesive property of the second pressure-sensitive adhesive layer may be suitably maintained.

In the second pressure-sensitive adhesive layer, at least one additive selected from the group consisting of a silane coupling agent, an epoxy resin, a curing agent, a UV stabilizer, an antioxidant, a coloring agent, a reinforcing agent, a filler, a foaming agent, a surfactant and a plasticizer may be further included as needed.

The second pressure-sensitive adhesive layer may also have a gel fraction of approximately 30 to 90%, 40 to 90%, 50 to 90%, 55 to 90%, 55 to 80% or 60 to 80%.

The gel fraction may be measured according to Equation 1.

In the range of the gel fraction, the second pressure-sensitive adhesive layer may exhibit suitable resistances with respect to cohesive strength and shear strength, and excellent cohesive property and repeelability with respect to an adherent.

A thickness of the second pressure-sensitive adhesive layer may be, for example, approximately 20 to 50 μm or 25 to 45 μm. The thickness may be changed according to a use for the pressure-sensitive adhesive tape.

The pressure-sensitive adhesive tape may further include a releasing film or sheet attached to the first and/or second pressure-sensitive adhesive layer as needed. As the releasing film or sheet, a general kind known in the field of pressure-sensitive adhesive tape may be used.

The pressure-sensitive adhesive tape may be manufactured in a conventional method known in the art. For example, after the components for forming the first and/or second pressure-sensitive adhesive layer are suitably mixed in a necessary weight ratio, the mixture is coated on a surface of the base layer to form a pressure-sensitive adhesive layer, or coated on a releasable base layer to form a pressure-sensitive adhesive layer. Subsequently, the pressure-sensitive adhesive layer is laminated on the base layer, thereby obtaining the pressure-sensitive adhesive tape.

Another aspect of the present application provides a polishing pad. The illustrative polishing pad may include the described pressure-sensitive adhesive tape and a polishing material attached to a pressure-sensitive adhesive layer of the pressure-sensitive adhesive tape. In one embodiment, the polishing material may be attached to the first pressure-sensitive adhesive layer.

The polishing pad may be used in an operation of polishing a surface of various parts or members, for example, in the field of automobiles, optical devices or semiconductors. Here, as a target to be polished, a glass substrate for an LCD, a substrate for a hard disk, an optical lens, or a silicon wafer may be used, but the present application is not limited thereto. In one embodiment, the target to be polished may be a glass substrate, for example, a 7th, 8th or higher generation glass substrate having a large area (e.g., 2200 mm×2500 mm).

As the polishing material attached to the pressure-sensitive adhesive tape, one conventionally used in the related art may be used. As the polishing material, for example, a polishing material including a polyurethane-based polishing layer such as solid polyurethane or polyurethane porous foam may be used. The polishing layer may be a layer in direct contact with the target to be polished in a polishing process, and the polishing layer may have a lattice-shaped, spherical or spiral groove structure in a grinding side.

The polishing material may further include a cushion layer. The material and position of the cushion layer is not particularly limited, and for example, a cushion layer such as polyurethane foam may be stacked or attached on one surface of the polishing layer.

The polishing material may have a thickness of, for example, 0.5 to 4 mm, 0.8 to 3 mm or 1 to 2 mm, but the present application is not limited thereto.

The polishing pad may be manufactured by attaching the polishing material to the pressure-sensitive adhesive layer of the pressure-sensitive adhesive tape. A method of manufacturing the illustrative polishing pad may include attaching the first pressure-sensitive adhesive layer to the polishing material at 50° C. or more.

In the illustrative manufacturing method, first, a temperature is increased at approximately 50° C., 60° C., 70° C., 80° C. or 90° C. or more to activate the first pressure-sensitive adhesive layer, and provide suitable flowability. In this state, the first pressure-sensitive adhesive layer may be effectively wetted with the polishing material. Accordingly, the polishing pad may be manufactured by laminating the polishing material on the first pressure-sensitive adhesive layer in a state in which suitable flowability is provided at the above temperature with a suitable pressure, and suitably decreasing the temperature to attach the polishing material to the pressure-sensitive adhesive tape.

In one embodiment, the attachment of the polishing material may be performed by a hot-roll lamination process.

At the decreased temperature, the first pressure-sensitive adhesive layer may effectively fix the polishing material, have high cohesive strength and adhesive strength, and exhibit a shear strength generated in the polishing process and an excellent resistance to the polishing solution used herein.

Still another aspect of the present application provides a polishing device. The polishing device may include a stand on which a target to be polished is loaded, and a carrier or surface plate for a polishing pad. In the carrier or surface plate for a polishing pad, the polishing pad may be attached to the carrier or surface plate for a polishing pad via the second pressure-sensitive adhesive layer of the pressure-sensitive adhesive tape.

Figure 2:
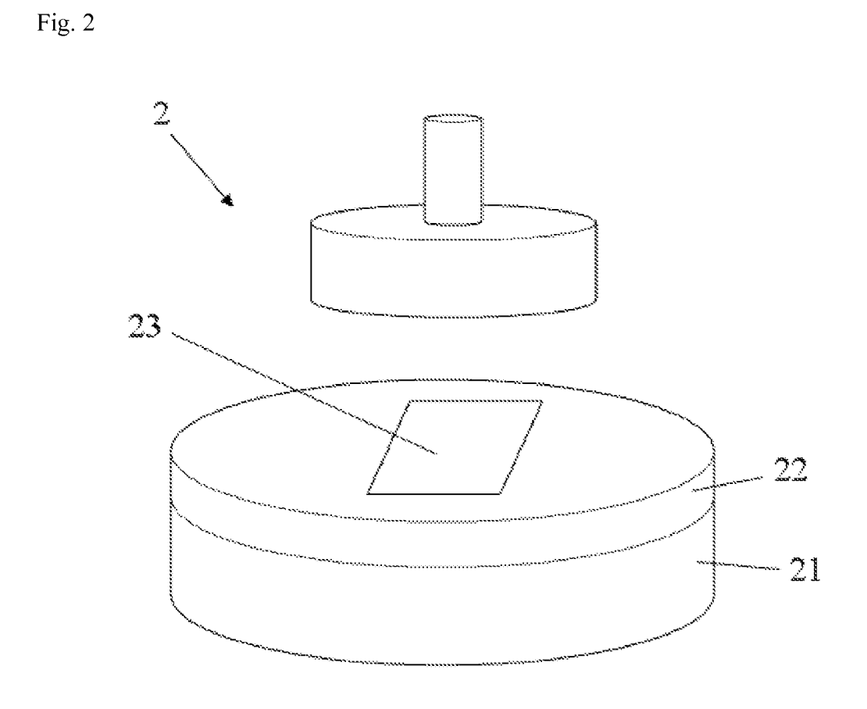
FIG. 2 is a schematic diagram of a configuration of a polishing device.

FIG. 2 is a diagram of an illustrative polishing device including a stand 21 on which a target to be polished 23 is loaded and a polishing device including a carrier 22, and a polishing pad may be attached to the carrier 22.

The polishing device may be, for example, a device for polishing a glass substrate for an LCD, a substrate for a hard disk, an optical lens or a silicon wafer. In the polishing device, the kinds of apparatuses, for example, the stand and carrier are not particularly limited as long as the above-described polishing pad is used, and a conventional apparatus known in the related art may be used.

Yet another aspect of the present application provides a method of manufacturing a glass substrate. The illustrative method may include a method of polishing a surface of the glass substrate using the polishing pad. In one embodiment, the glass substrate may be a glass substrate manufactured in a floating type. In addition, the glass substrate may be a glass substrate for an LCD such as a substrate for a color filter or a substrate for a TFT.

The pressure-sensitive adhesive tape or polishing pad may effectively fix a polishing material even when formed in a large size described above, and may have excellent resistance to water or a polishing solution and to shear strength applied in a polishing process. Accordingly, according to the manufacturing method using the pressure-sensitive adhesive tape or polishing pad, for example, a surface of a 7th or 8th generation large-sized glass substrate may be effectively polished.

The method of manufacturing a glass substrate may be a conventional method without particular limitation as long as the polishing pad is used. For example, the manufacturing method may be performed in a polishing method at a suitable rate, which includes loading the glass substrate manufactured in a floating type on the stand 21 of the polishing device, and dispersing a polishing solution in which cesium oxide is dispersed through a nozzle equipped in the polishing device using a polishing pad attached to the carrier 22.

Effect

An illustrative pressure-sensitive adhesive tape of the present application may be a pressure-sensitive adhesive tape for a polishing material. For example, the pressure-sensitive adhesive tape can be effectively fixed to a surface plate without bubbles, and have excellent resistance to water and a polishing solution and shear strength applied in a polishing process. In addition, the pressure-sensitive adhesive tape can be easily removed from a carrier or the surface plate without residue after polishing.

ILLUSTRATIVE EMBODIMENTS

Hereinafter, a pressure-sensitive adhesive tape will be described in further detail with reference to Examples and Comparative Examples, but the scope of the pressure-sensitive adhesive tape is not limited to the following Examples.

In the specification, physical properties are evaluated by the following methods.

1. Evaluation of Initial Adhesive Strength

A sample was prepared by cutting a pressure-sensitive adhesive tape manufactured in Example or Comparative Example to have a horizontal length of 2.54 cm and a vertical length of 12.7 cm. In evaluation of an adhesive strength, as an adherent, an aluminum plate washed with ethyl acetate was used after it was maintained in a constant temperature and constant humidity container at 25° C. and a relative humidity of 50% for 24 hours. A second pressure-sensitive adhesive layer of the sample was attached to the aluminum plate and peeled off at a peel angle of 180 degrees and a peeling rate of 300 mm/min after 30 minutes of the attachment, and a peel strength was measured. The peel strength was defined as an initial adhesive strength.

2. Change in Adhesive Strength with Elapsed Time

A second pressure-sensitive adhesive layer of the sample used in the manufacture of the initial adhesive strength was attached to the same adherent used in the measurement of the initial adhesive strength, a peel strength was measured by the same method as described above after 7 days of the attachment, and then the measured peel strength was defined as a late adhesive strength. A change with elapsed time was measured by substituting the initial and late adhesive strengths into Equation 2. Conventionally, if the change with elapsed time is within 20%, there can be considered to be no change.

$$\text{Change in adhesive strength according to time} = 100 \times \Delta P/P_i \quad \text{[Equation 2]}$$

In Equation 2, $\Delta P$ is an absolute value of a difference between the initial adhesive strength and the late adhesive strength, and $P_i$ is the initial adhesive strength.

3. Measurement of Gel Fraction

Approximately 0.3 g of a first or second pressure-sensitive adhesive layer manufactured in Example or Comparative Example was taken and added to a stainless 200 mesh iron net, precipitated in ethyl acetate, and maintained in a dark room at room temperature for 2 days. Subsequently, the pressure-sensitive adhesive layer (insoluble content) which was not insoluble in ethyl acetate was taken, and dried in an oven at 70° C. for 4 hours. A weight (dry weight, unit: g) of the resulting product was measured, and substituted into the following Equation, thereby measuring a gel fraction.

$$\text{Gel fraction}(\%) = (\text{Measured dry weight})/0.3 \times 100 \quad \text{[Equation 1]}$$

4. Evaluation of Holding Power

A sample was prepared by cutting a pressure-sensitive adhesive tape manufactured in Example or Comparative Example to have a horizontal length of 25 mm and a vertical length of 50 mm. In evaluation of holding power, as an adherent, an aluminum plate washed with ethyl acetate was used after being maintained in a constant temperature and constant humidity container at 25° C. and a relative humidity of 50% for 24 hours. A first pressure-sensitive adhesive layer of the sample was attached to the aluminum plate, and a 1 kg weight was given to the pressure-sensitive adhesive tape, and then the tape was maintained in a constant temperature container at 80° C. for 1 hour. A holding power was evaluated by measuring a distance the pressure-sensitive adhesive tape slid from the adherent. The holding power can be considered as a criterion of durability and reliability of the pressure-sensitive adhesive tape.

5. Evaluation of Reworkability

A sample was prepared by cutting a pressure-sensitive adhesive tape manufactured in Example or Comparative Example to have a horizontal length of 440 mm and a vertical length of 500 mm. A second pressure-sensitive adhesive layer of the sample was attached to an aluminum plate, and maintained in a constant temperature and constant humidity container at 80° C. and a relative humidity of 85% for 72 hours. Afterward, the pressure-sensitive adhesive tape was peeled off from the aluminum plate, and then reworkability was evaluated according to the following criteria under the same condition as used in the measurement of the initial adhesive strength.

[Criteria of Evaluating Reworkability]

○: when contamination such as a residue of the pressure-sensitive adhesive layer was not observed on the aluminum plate with the naked eye Δ: when contamination such as a residue of the pressure-sensitive adhesive layer was somewhat observed on the aluminum plate with the naked eye x: when severe contamination such as a residue of the pressure-sensitive adhesive layer was observed on the aluminum plate with the naked eye 6. Evaluation of Water Resistance A sample was prepared by cutting a pressure-sensitive adhesive tape manufactured in Example or Comparative Example to have a horizontal length of 2.54 mm and a vertical length of 12.7 mm. A second pressure-sensitive adhesive layer of the sample was attached to an aluminum plate, and immersed in water at 23° C. for 24 hours. The pressure-sensitive adhesive tape was peeled off from the aluminum plate taken out of water, and a peel strength was measured under the same condition as used in measurement of the initial adhesive strength.

7. Peel in Polishing

A first pressure-sensitive adhesive layer of a pressure-sensitive adhesive tape manufactured in Example or Comparative Example was stacked and laminated to a porous polyurethane polishing pad using a laminator. Afterward, a second pressure-sensitive adhesive layer was attached to a surface plate for fixing a polishing device. After a glass for an LCD was stacked on a polishing pad, polishing was performed by spraying polishing a slurry onto the glass at a pressure of 50 kPa and 100 rpm for 5 minutes, which is defined as one cycle. Peeling in polishing was evaluated according to the following criteria.

[Evaluation Criteria]

○: when peeling was not observed at an interface between the pressure-sensitive adhesive tape and the surface plate even when polishing was repeated 10 cycles Δ: when peeling was not observed on an edge of the interface between the pressure-sensitive adhesive tape and the surface plate even when polishing was repeated 10 cycles x: when peeling was not observed at the interface between the pressure-sensitive adhesive tape and the surface plate when polishing was performed 1 cycle Preparation Example 1

Synthesis of Acrylic Resin (A1)

95 parts by weight of n-butyl acrylate (n-BA) and 5 parts by weight of acrylic acid were put into a 2 L reactor refluxing nitrogen gas and equipped with a cooling device to facilitate control of temperature. Subsequently, as a solvent, 120 parts by weight of ethyl acetate (EAc) was put thereinto, and nitrogen gas was purged for 60 minutes to remove oxygen. Afterward, a temperature was maintained at 70° C., and 0.02 parts by weight of azobisisobutyronitril (AIBN) was put thereinto as a reaction initiator, and reacted for 8 hours, thereby synthesizing an acrylic resin (A1). A molecular weight of the synthesized resin (A1) was measured by GPC, and the results are summarized in Table 1.

Preparation Example 2

Synthesis of Acrylic Resin (B1)

An acrylic resin (B1) was prepared by performing polymerization as described in Preparation Example 1, except that 49 parts by weight of 2-ethylhexyl acrylate (2-EHA), 30 parts by weight of n-butyl acrylate (n-BA), 10 parts by weight of methyl acrylate, 10 parts by weight of isobornyl acrylate and 1 part by weight of 4-hydroxybutyl acrylate (4-HBA) were put into a reaction vessel as monomers.

Preparation Examples 3 to 7

Synthesis of Acrylic Resins (B2), (B3), (C1) and (C2)

Each resin was prepared by a method as described in Preparation Example 1, except that the weight ratio of the monomer and the ratio of a solvent were changed as shown in Table 1.

TABLE 1

|  |  | Preparation Example | | | | | | |
|---|---|---|---|---|---|---|---|---|
|  |  | 1 | 2 | 3 | 4 | 5 | 6 | 7 |
|  |  | A1 | A2 | B1 | B2 | B3 | C1 | C2 |
| Composition | BA | 95 | 45 | 30 | 30 | 30 | 44 | 48 |
| of monomer | EHA | — | 50 | 49 | 49 | 48 | 52 | 50 |
|  | IBOA | — | — | 10 | 15 | 10 | — | — |
|  | MA | — | — | 10 | 5 | 10 | — | — |
|  | AA | 5 | 5 | — | — | — | 4 | — |
|  | HBA | — | — | 1 | 1 | 2 | — | 2 |
| AIBN |  | 0.02 | 0.02 | 0.02 | 0.02 | 0.02 | 0.02 | 0.02 |
| EAc |  | 120 | 120 | 100 | 100 | 100 | 120 | 140 |
| Mw |  | 78 | 65 | 90 | 85 | 95 | 88 | 60 |

BA: n-butyl acrylate
EHA: 2-ethylhexyl acrylate
IBOA: isobornyl acrylate
MA: methyl acrylate
AA: acrylic acid
HBA: 4-hydroxybutyl acrylate
AIBN: azobisisobutyronitrile
EAc: ethyl acetate
Mw: weight average molecular weight(unit: 10,000)
Content unit: parts by weight Example 1

Preparation of Pressure-Sensitive Adhesive Composition

A composition (A) for forming a first pressure-sensitive adhesive layer was prepared by mixing 100 g of an acrylic resin (A1), 0.08 g of N,N,N',N'-tetraglycidylethylenediamine and 25 g of rosin ester-based tackifier (Foral 85, Hercules), putting 30 g of ethyl acetate, and uniformly stirring to mix the resulting mixture for 10 to 20 minutes. In addition, a composition (B) for forming a second pressure-sensitive adhesive layer was prepared by blending 100 g of acrylic acid (B1) and 0.1 g of a tolylene diisocyanate of trimethylol propane, and uniformly mixing the resulting blend with the composition (A).

Preparation of Pressure-Sensitive Adhesive Tape

A second pressure-sensitive adhesive layer was formed by performing corona treatment on one surface of a poly (ethylene terephthalate) (PET) base layer (thickness: 188 μm, Torei), coating a coating solution prepared by diluting the pressure-sensitive adhesive composition (B) at a suitable concentration in consideration of coatability on the corona-treated surface to have a thickness after drying of 35 μm, and aging the coated solution to suitably perform a crosslinking reaction. Afterward, a first pressure-sensitive adhesive layer was prepared by also performing corona treatment on the other surface of the PET base layer, coating a coating solution prepared by diluting the pressure-sensitive adhesive composition (A) at a suitable concentration in consideration of coatability on the corona-treated surface to have a thickness after drying of 55 μm, and aging the coated solution to suitably perform a crosslinking reaction, thereby manufacturing a pressure-sensitive adhesive tape.

Manufacture of Polishing Pad

A polishing pad was manufactured by thermally laminating the first pressure-sensitive adhesive layer of the pressure-sensitive adhesive tape to a porous polyurethane-based polishing material using a heating laminator.

Examples 2 to 7 and Comparative Examples 1 to 4

Pressure-sensitive adhesive tapes and polishing pads according to Examples 2 to 7 and Comparative Examples 1 to 4 were manufactured by the same method as described in Example 1, except that components of pressure-sensitive adhesive compositions for forming first and second pressure-sensitive adhesive layers were changed as shown in Tables 2 and 3.

TABLE 2

| | | Example | | | | | | |
|---|---|---|---|---|---|---|---|---|
| | | 1 | 2 | 3 | 4 | 5 | 6 | 7 |
| First pressure-sensitive adhesive layer | Kind of resin | A1 | A1 | A1 | A2 | A2 | A2 | A1 |
| | Content of resin | 100 | 100 | 100 | 100 | 100 | 100 | 100 |
| | Content of crosslinking agent | 0.08 | 0.05 | 0.08 | 0.08 | 0.05 | 0.08 | 0.08 |
| | Content of tackifier | 25 | 20 | 30 | 20 | 20 | 30 | 25 |
| | Gel fraction | 50% | 47% | 45% | 51% | 46% | 47% | 48% |
| Second pressure-sensitive adhesive layer | Kind of resin | B1 | B2 | B3 | B1 | B2 | B3 | B1 |
| | Content of resin | 100 | 100 | 100 | 100 | 100 | 100 | 100 |
| | Content of crosslinking agent | 0.1 | 0.1 | 0.1 | 0.1 | 0.1 | 0.1 | 0.1 |
| | Content of plasticizer | — | — | — | — | — | — | 3 |
| | Gel fraction | 68% | 70% | 75% | 67% | 71% | 76% | 65% |

Content unit: parts by weight
crosslinking agent (first pressure-sensitive adhesive layer): N,N,N',N'-tetraglycidylethylenediamine
crosslinking agent (second pressure-sensitive adhesive layer): tolylene diisocyanate addition of trimethylol propane
tackifier: rosin ester-based tackifier (Foral 85, Hercules)
plasticizer: poly(ethyleneglycol) bis(2-ethyl hexanoate)

TABLE 3

| | | Comparative Example | | | |
|---|---|---|---|---|---|
| | | 1 | 2 | 3 | 4 |
| First pressure-sensitive adhesive layer | Kind of resin | A1 | A1 | A2 | A2 |
| | Content of resin | 100 | 100 | 100 | 100 |
| | Content of crosslinking agent | 0.1 | 0.1 | 0.1 | 0.1 |
| | Gel fraction | 78% | 75% | 50% | 45% |
| Second pressure-sensitive adhesive layer | Kind of resin | C1 | C2 | C1 | C2 |
| | Content of resin | 100 | 100 | 100 | 100 |
| | Content of crosslinking agent | 0.1 | 0.1 | 0.05 | 0.05 |
| | Gel fraction | 66% | 66% | 60% | 58% |

Content unit: parts by weight
crosslinking agent(first pressure-sensitive adhesive layer): N,N,N',N'-tetraglycidylethylenediamine
crosslinking agent (second pressure-sensitive adhesive layer): tolylene diisocyanate addition of trimethylol propane The physical properties measured in Examples and Comparative Examples are summarized and listed in Tables 4 and 5.

TABLE 4

| | Example | | | | | | |
|---|---|---|---|---|---|---|---|
| | 1 | 2 | 3 | 4 | 5 | 6 | 7 |
| Initial adhesive strength (g/in) | 200 | 220 | 180 | 200 | 180 | 180 | 150 |
| Change in adhesive strength with elapsed time (%) | 15 | 17 | 12 | 15 | 16 | 13 | 10 |
| Holding power | 0.2 m or less | 0.2 m or less | 0.2 m or less | 0.4 m or less | 0.4 m or less | 0.4 m or less | 0.4 m or less |
| Reworkability | ○ | ○ | ○ | ○ | ○ | ○ | ○ |
| Water resistance (g/in) | 180 | 200 | 170 | 175 | 170 | 160 | 140 |
| Peeling in polishing | ○ | ○ | ○ | ○ | ○ | ○ | ○ |

TABLE 5

| | Comparative Example | | | |
|---|---|---|---|---|
| | 1 | 2 | 3 | 4 |
| Initial adhesive strength (g/in) | 270 | 150 | 350 | 170 |
| Change in adhesive strength with elapsed time (%) | 50 | 29 | 45 | 26 |
| Holding power | detached | detached | detached | detached |
| Reworkability | X | ○ | X | Δ |
| Water resistance (g/in) | 280 | 100 | 340 | 150 |
| Peeling in polishing | X | X | X | X |

Detached: the state that the pressure-sensitive adhesive tape was peeled off from the aluminum plate during evaluation of the holding power.

What is claimed is:

1. A polishing pad, comprising:
a pressure-sensitive adhesive tape comprising a first pressure-sensitive adhesive layer and a second pressure-sensitive adhesive layer; and
a polishing material attached to the first pressure-sensitive adhesive layer of the pressure-sensitive adhesive tape, wherein the polishing material includes a polyurethane-based polishing layer,
wherein the pressure-sensitive adhesive tape comprises:
a base layer;
the first pressure-sensitive adhesive layer located on one surface of the base layer; and
the second pressure-sensitive adhesive layer located on the other surface of the base layer, the second pressure-sensitive adhesive layer including an acid-free pressure-sensitive adhesive resin consisting of a lipophilic monomer represented by a compound of Formula 1 at 10 to 30 parts by weight, a (meth)acrylic acid ester monomer other than the lipophilic monomer represented by the compound of Formula 1 at 50 to 99 parts by weight, and a crosslinkable monomer not having a carboxyl group at 0.1 to 10 parts by weight, in a polymerized state,
wherein the first pressure-sensitive adhesive layer includes a pressure-sensitive adhesive resin consisting of a (meth)acrylic acid ester monomer other than the lipophilic monomer represented by the compound of Formula 1:

[Formula 1]

where $R_1$ to $R_3$ are each independently hydrogen or an alkyl group having 1 to 4 carbon atoms, $R_4$ is an aryl group having 6 to 25 carbon atoms or —C(=O)—O—

X, where X is a methyl group, a tert-butyl group, or a cycloalkyl group having 6 to 12 carbon atoms,
at 50 to 99 parts by weight and a crosslinkable monomer at 0.1 to 10 parts by weight in a polymerized state,
wherein the acid-free pressure-sensitive adhesive resin is a pressure-sensitive adhesive not having a carboxyl group,
wherein the acid-free pressure-sensitive adhesive resin has a molecular weight (Mw) of from 800,000 to 2,000,000, and
wherein according to Equation 1:

$$\text{Gel fraction (\%)} = B/A \times 100 \qquad \text{[Equation 1]}$$

where A is a weight of the pressure-sensitive adhesive layer, and B is a dry weight of an insoluble content obtained after the pressure-sensitive adhesive layer having the weight A is precipitated in ethyl acetate at room temperature for 48 hours,
the first pressure-sensitive adhesive layer has a gel fraction according to Equation 1 of 40 to 48%, and
the second pressure-sensitive adhesive layer has a gel fraction according to Equation 1 of 65 to 76%.

2. The polishing pad according to claim 1, wherein the first pressure-sensitive adhesive layer includes a pressure-sensitive adhesive resin and a tackifier having a glass transition temperature or softening point of 85° C. or more.

3. The tape polishing pad according to claim 2, wherein the first pressure-sensitive adhesive layer includes the tackifier at 1 to 70 parts by weight with respect to 100 parts by weight of the pressure-sensitive adhesive resin.

4. The polishing pad according to claim 2, wherein the tackifier is a hydrocarbon resin or hydrogenated product thereof, a rosin resin or hydrogenated product thereof, a rosin ester resin or hydrogenated product thereof, a terpene resin or hydrogenated product thereof, a terpene phenol resin or hydrogenated product thereof, a polymerized rosin resin, or a polymerized rosin ester resin.

5. The polishing pad according to claim 2, wherein the first pressure-sensitive adhesive layer further includes a multifunctional crosslinking agent at 0.001 to 7 parts by weight with respect to 100 parts by weight of the pressure-sensitive adhesive resin.

6. The polishing pad according to claim 1, wherein the second pressure-sensitive adhesive layer further includes a multifunctional crosslinking agent at 0.01 to 10 parts by weight with respect to 100 parts by weight of the acid-free pressure-sensitive adhesive resin.

7. The tape polishing pad according to claim 1, wherein the second pressure-sensitive adhesive layer further includes a plasticizer at 0.5 to 30 parts by weight with respect to 100 parts by weight of the pressure-sensitive adhesive resin.

8. A polishing device, comprising:
a stand on which a target to be polished is loaded; and
a carrier or surface plate for a polishing pad to which the polishing pad of claim 1 is attached by the second pressure-sensitive adhesive layer of the pressure-sensitive adhesive tape.

9. A method of manufacturing a polishing pad, comprising:
attaching a polishing material to the first pressure-sensitive adhesive layer of the pressure-sensitive adhesive tape of the polishing pad of claim 1 at 50° C. or more.

10. The method according to claim 9, wherein the attaching of the first pressure-sensitive adhesive layer to the polishing material is performed by a hot-roll lamination method.

11. A method of manufacturing a polished glass substrate, comprising:
polishing a surface of a glass substrate using the polishing pad of claim 1.

12. The method according to claim 11, wherein the polished glass substrate is a glass substrate manufactured in a floating type.

13. The method according to claim 11, wherein the polished glass substrate is a glass substrate for a liquid crystal display (LCD).

* * * * *